United States Patent
Pugh

(10) Patent No.: US 11,453,293 B2
(45) Date of Patent: Sep. 27, 2022

(54) SYSTEM AND METHOD FOR SECURE OPERATION OF A VEHICLE MOUNTED PTO-DRIVEN GENERATOR SYSTEM

(71) Applicant: Contour Hardening, Inc., Indianapolis, IN (US)

(72) Inventor: Nathan D. Pugh, Avon, IN (US)

(73) Assignee: Contour Hardening, Inc., Indianapolis, IN (US)

(*) Notice: Subject to any disclaimer, the term of this patent is extended or adjusted under 35 U.S.C. 154(b) by 316 days.

(21) Appl. No.: 16/848,198

(22) Filed: Apr. 14, 2020

(65) Prior Publication Data

US 2021/0316617 A1  Oct. 14, 2021

(51) Int. Cl.

| | |
|---|---|
| *B60K 6/445* | (2007.10) |
| *B60L 15/00* | (2006.01) |
| *B62D 21/02* | (2006.01) |
| *B60K 5/12* | (2006.01) |
| *B60R 25/20* | (2013.01) |
| *H02P 9/00* | (2006.01) |
| *B60R 25/01* | (2013.01) |
| *H02P 101/45* | (2016.01) |
| *H02P 101/25* | (2016.01) |

(52) U.S. Cl.
CPC ............ *B60L 15/007* (2013.01); *B60K 5/12* (2013.01); *B60R 25/01* (2013.01); *B60R 25/2063* (2013.01); *B62D 21/02* (2013.01); *H02P 9/008* (2013.01); *H02P 2101/25* (2015.01); *H02P 2101/45* (2015.01)

(58) Field of Classification Search
CPC ......... B60L 15/007; B60K 5/12; B60K 6/445; B60R 25/01; B60R 25/2063; B62D 21/02; H02P 9/008; H02P 2101/25; H02P 2101/45

See application file for complete search history.

(56) References Cited

U.S. PATENT DOCUMENTS

| | | |
|---|---|---|
| 5,670,831 A | 9/1997 | Georgiades |
| 6,060,981 A | 5/2000 | Landes |
| 6,979,913 B2 | 12/2005 | Storm et al. |
| 7,057,303 B2 | 6/2006 | Storm et al. |
| 9,132,805 B1 | 9/2015 | King et al. |
| 10,328,940 B2 | 6/2019 | Cikalo et al. |
| 2005/0184528 A1* | 8/2005 | Storm ................... B60K 25/06 290/40 C |
| 2011/0320083 A1* | 12/2011 | Nishimura .............. F02D 29/02 903/905 |

* cited by examiner

*Primary Examiner* — Cortez M Cook
(74) *Attorney, Agent, or Firm* — Woodard, Emhardt, Henry, Reeves & Wagner, LLP

(57) ABSTRACT

A vehicle mounted AC generator system having an AC generator mounted driven by the vehicle's power-take off having a secure control system. The secure control system integrates with the AC generator, the power-take off and the vehicle to enable the generator to be operated by the vehicle's engine while the cab or passenger compartment of the vehicle remains secured, thereby preventing the potential for theft or accidental input which may create a dangerous condition. The secure control system also provides monitoring of the generator's operation and emergency stop capability to shut down both the generator and the vehicle's engine in the event required.

20 Claims, 4 Drawing Sheets

SYSTEM AND METHOD FOR SECURE OPERATION OF A VEHICLE MOUNTED PTO-DRIVEN GENERATOR SYSTEM

FIELD OF THE INVENTION

The present invention relates to safety systems for vehicle mounted electrical generators and more specifically safety and anti-theft systems for use with the operation of a PTO-driven electrical generator mounted to a vehicle.

BACKGROUND OF THE INVENTION

There has long been a need for an AC electrical power source in locations not served by electrical utilities. Usually these involve construction sites where the electrical power grid is not yet extended to an individual site. In addition, there are sites that are so remote that electricity is not available. Presently, a number of different devices and methods are utilized to provide mobile AC electrical power for this and other needs.

The predominant solution has been the use of self-powered portable generators. For small power needs, these portable generators may be transported by the user, but for larger power needs, a tow behind or other large scale generator may be required. A more recent solution has been the inclusion of electrical power generation equipment on-board utility vehicles, such as work trucks. AC power generated by a vehicle can be accomplished in one of two ways, either by using an inverter or by using a PTO-driven generator.

Inverters take DC voltage, often stepping it up to well above 240 volts, and then electronically manipulating the DC signal so that some form of AC signal at either 120 volts or 240 volts is provided at an outlet box. The system shown in U.S. Pat. No. 6,157,175 is typical of such systems. These systems involve an alternator positioned in or near the engine compartment and driven off of an accessory belt drive. While inverter based systems are feasible, they traditionally lack the ability to achieve even a reasonable level of current output, and thus they lack the ability to supply heavy power-consuming industrial devices, such as an arc welder.

An electrical generator has a mechanically rotating component which are often driven by the power take-off of a vehicle's engine or transmission. It can provide the robust high-current AC power that is typically required by industrial devices or other heavy-duty users. Depending upon the specification of the vehicle's engine, a generator can be sized up to at least 180 kVA and provide between 120V single phase up to 500V three phase. This is sufficient to power large industrial loads. The system shown in U.S. Pat. No. 7,057,303, which is commonly owned, is representative of such systems.

Unfortunately, while vehicle driven generators are well suited to providing robust power, they present several issues for improvement. Most importantly, when the generator is in operation, the user is typically remote from the cab or passenger compartment of the vehicle. This occurs as the user is typically operating the electrically powered equipment, which may be located near the back of the vehicle, or in extreme cases, may be located hundreds of feet away in a location where the vehicle is out of sight. This means that should a malfunction or other dangerous condition present itself, the user would be unlikely or delayed in learning of it and responding. While the vehicle itself may have protective electronics which would disable the vehicle, a need exists for a system which robustly monitors the generator and enables an immediate shut down of both the vehicle and generator in an emergency.

In addition to the safety concerns identified above, the typical usage of a vehicle mounted generator also leaves the vehicle vulnerable as it must be left running to provide power to the generator. In order for the vehicle to be left running, typically the keys must be left in the ignition. As a result, it can be difficult or impossible to secure the vehicle's cab or passenger compartment, which provides a potential for theft or vandalism of an expensive vehicle, which often includes expensive equipment inside, including the generator system. In addition to these risks, the vehicle could accidentally be placed into gear or turned off by an unauthorized person, which could also create significant safety issues, depending upon the type of equipment being powered by the generator at a given time.

Accordingly, what is needed is a system to enable the operator of such a vehicle to operate the vehicle and its generator system while still securing the vehicle from theft or other unauthorized access. In addition, a completely integrated safety system is desirable to effect the shutdown of the generator as well as the vehicle upon any indication that the system is operating outside of the desired and safe parameters.

DETAILED DESCRIPTION OF THE SPECIFIC EMBODIMENTS

Figure 1:
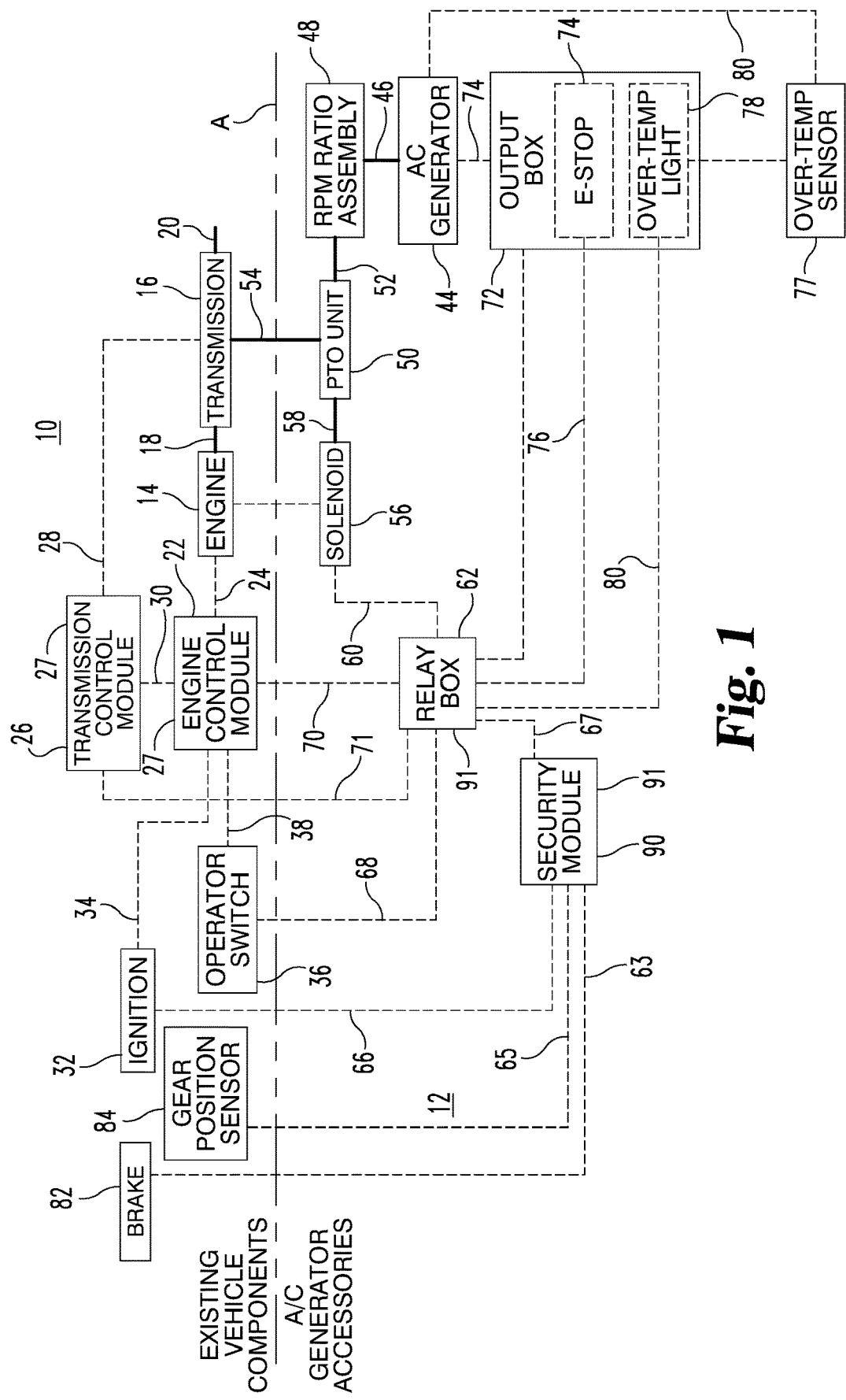
FIG. 1 is a diagrammatic view of one implementation of a vehicle mounted AC generator system capable of secure operation of the present invention.

For the purposes of promoting and understanding of the principles of the invention, reference will now be made to the embodiment illustrated in the drawings and specific language will be used to describe the same. It will nevertheless be understood that no limitation of the scope of the invention is thereby intended. While examples are provided as to aircraft, these principles are equally applicable to airport vehicles as well. Any alterations and further modifications in the described embodiments, and any further applications of the principles of the invention as described herein are contemplated as would normally occur to one skilled in the art to which the invention relates.

Many vehicle mounted AC electrical generation systems exist. One well-known configuration involves a PTO-driven generator which is mounted to the vehicle, such as its frame. Such a system is described in U.S. Pat. No. 6,979,913 to Storm, which is hereby incorporated by reference to the extent not inconsistent. While the Storm system provides precise and reliable power, it and other solutions' requirement that the vehicle remain running to operate the generator, left the vehicle vulnerable to theft and safety concerns. The improved system and methods described herein seek to improve upon this art.

FIG. 1 shows such a vehicle system 10 with which an AC electrical generating system is incorporated. The existing vehicle components and AC generator accessories are demarked by a reference line A, with those above the line being originally equipped on the vehicle, and those below the line being a part of the present system. In the illustrated embodiment, vehicle 20 of FIG. 1 is based upon a late model Ford F-550 work truck, however, it shall be appreciated that any other type of vehicle may be utilized, depending upon its power and equipment available.

The vehicle 10 has a frame, not illustrated in FIG. 1, which is supported above the ground by wheels and a suspension (not shown). The frame provides support for a vehicle body, also not shown, and an engine 14 driving a transmission 16 through a primary mechanical output 18 to function as a prime mover for vehicle 10. Engine 14 may be any one of a variety of prime movers including a spark-ignited gasoline or natural gas fueled engine or a compression ignition diesel engine. It should be apparent to those skilled in the art that other forms of prime movers providing mechanical outputs could alternatively be incorporated. The transmission 16 may be one of a variety of transmissions herein shown as an automatic transmission providing a rotatable output shaft 20 for the vehicle 10.

The engine 14 may be controlled by an engine control module (ECM) 22 interconnected to engine 14 at 24. In a number of vehicles, the transmission 16 has a more sophisticated control through a transmission control module 26 interconnected to transmission 16 through 28 and connected to engine control module 22 through 30. The transmission control module 26, ECM 22, engine 14 and transmission 16 are all coordinated so that the appropriate balance of required power, fuel economy and emissions level is maintained. In one form, including the late model Ford F-550, the ECM 22 and TCM 26 may be logically integrated into a single powertrain control module (PCM) 27. In most modern applications, a potentiometer sends a modified 5 VDC signal to the ECM 22 or PCM 27 in order to specify the engine speed desired during PTO operation or by programming the ECM 22 or PCM 27 to go to a preset high idle when an input signal is received on a particular pin of the ECM 22 or PCM 27.

The vehicle 10 has an ignition switch 32, which may include an ignition lock cylinder for receiving a key, connected to ECM 22 by line 34, which controls the accessory power and operation of the engine 14 depending upon the state of the switch and the presence of an authorized key. For example, the ignition switch may include a lock position, an accessory position, a run position and a start position, all of which are achieve by rotating the ignition switch or cylinder to the corresponding position. The vehicle 10 also has an operator's switch 36 connected to ECM 22 by line 38 for controlling the power takeoff (PTO) described later. Traditionally, this operator switch 36 may be an existing vehicle upfitter switch provided by the vehicle's manufacturer for subsequent accessory integration. Alternatively, an aftermarket switch may be added and utilized if desired or preferred.

The AC generator system generally indicated by 12 comprises an AC generator 44 that can be selected from various sizes and manufacturers. Measured in units of apparent power, it has been found that up to 180 kVA is readily accommodated within vehicles as set out below. It should be apparent to those skilled in the art, however, that many other AC generators and sizes thereof could be employed for this purpose. One of the advantages of an AC generator is that it produces a perfect sine wave which replicates the sine wave produced by utility companies as opposed to the modified or mock sine wave produced by standard inverters on the market. It is also a feature of AC generators that they are very robust and can easily handle high continuous current loadings as would be experienced in typical construction site activities like welding and heavy-duty cutting of materials.

The AC generator has a mechanical power input 46 which is adapted to receive a rotatable input, which may pass through an RPM ratio assembly 48, which can be used where it is necessary to further step up or step down the rotational speed from the PTO unit 50 to match that required by the AC generator 44. It shall be appreciated that some level of RPM adjustment may be achieve in the selection of the PTO unit 50. If present, RPM Ratio Assembly 48 is connected to a PTO unit 50 via an appropriate mechanical link such as a shaft 52. In the illustrated embodiment, PTO unit 50 is driven from transmission 16 through an engageable and disengageable mechanical connection 54. A solenoid 56 mechanically connects with PTO unit 50 through a connection 58 to engage or disengage PTO unit 50 and thus drive the AC generator 44 as will be described later. In an alternate form, depending upon the configuration of vehicle 10, PTO unit 50 may be connected to and driven by a PTO port on the prime mover, such as engine 14, in an engine driven PTO configuration.

In the illustrated embodiment, solenoid 56 is of a type that is biased to a disengaged position in the absence of an electrical signal and then urged to an engaged position when an electrical signal is sent to solenoid 56 via line 60. Line 60 is connected to a relay box 62 which enables engagement of solenoid 56 and therefore mechanical operation of AC generator 44 only when certain conditions exist. In one form, the relay box receives input from the security module 90, described later, via line 67. Finally, the relay box receives an input from ECM 22 via line 70 and from the transmission control module via line 71. It shall be appreciated the one or more inputs or signals received by the relay box 62 may alternatively be received by the security module 90 and passed along via line 67. Relay box 62 includes at least one relay, and may include more. In one form, the at least one relay is mounted with a weatherproof box, but such an enclosure is not necessary for purpose of this invention.

The electrical output of AC generator 44 extends to output box 72 via power line 74. Output box 72 has usual electrical receptacles and may be mounted anywhere on the vehicle, such as within the cab, to the bed or within a "box" or other cargo area mounted to the rear of the frame where the bed would normally exist. In addition, output box contains an emergency stop switch 74 having a line 76 which connects with relay box 62. In addition, output box 72 has an over-temperature light 78 also connected to relay box 62 by means of a line 80. The over temperature light 78 is fed by an over temperature sensor 77 resident within generator 44.

The AC generator system 12 disclosed above takes advantage of the fact that the ECM 22 accurately controls the RPM of engine 14 under a variety of circumstances including conditions where the engine control module maintains a preselected RPM. In certain vehicles having the capability to connect a power takeoff unit or PTO, there is a feature within the ECM 22 and transmission control module 26 known as the PTO program. The PTO program dictates the prime mover to operate at an RPM that is maintained essentially constant but at a level higher than the normal RPM of the vehicle when it is operating at normal idle. For example, if the normal idle of a vehicle is under 1,000 RPM, the PTO program controls to 1,150 RPM. The drive ratio in housing 48 is selected so that the RPM of the AC generator 44 would be at its optimum to replicate a utility sine wave. Generally speaking, the AC generator's optimum RPM is 1800 for 60 cycles AC in the U.S. and 1500 RPM for 50 cycles found outside of the U.S. However, other speeds, including 3600 for 60 cycles AC in the U.S. and 3000 RPM for 50 cycles as non-limiting examples, could also be utilized. Thus the RPM of the generator 44 is extremely accurately controlled by virtue of the governing aspect of the engine control module 22 which varies the quantity of fuel delivered to the engine 14 to account for variations in mechanical load when the electrical loads through output box 72 are varied.

In existing systems, relay box 62 plays a key role as a trigger sensor 91 in that it enables operation of solenoid 56 so that the AC generator system is only operated when conditions are safe. However, the engine is not disabled as no connection exists to enable this function. In traditional AC generator systems, as here, the following conditions must exist before solenoid 56 can be engaged: (1) automatic transmission in park as sensed through line 71, (or if a manual transmission, in neutral with vehicle parking brake set), (2) operator switch 36 on as sensed through line 68, security device 90 and line 67, (3) ignition switch 32 on as sensed through line 66, security device 90 and line 67 (4) over-temperature sensor 77 normal as sensed through line 80 and (5) emergency stop switch 74 not activated as sensed through line 76. When these are present, the solenoid is engaged and when the ignition switch 32 is turned to start the engine 14, the solenoid 56 engages the PTO unit 50 to drive AC generator 44. The operator switch 36 is activated to place the engine 22 in the PTO program for optimum operation of the AC generator 44. The AC generator 44 supplies electrical power through the output box 72. This continues until either: (1) the operator switch 36 is turned off, (2) the ignition switch 32 is turned off, (3) the emergency switch 74 in output box 72 is activated, or (4) the over-temperature sensor 78 indicates too high a temperature through output box 72. However, through use of the security module 90 and its connection to the ignition 32 of vehicle 10, the engine 14 may now be disabled upon the occurrence of any of these disabling conditions, if desired, as well as upon the occurrence of several other conditions, which will be described below.

Also present in system 12 of FIG. 1 is security module 90, which in the illustrated embodiment is a stand-alone non-OEM component added to vehicle 10 during the installation of AC generator system 12. Security module 90 is connected the operator switch 36 via lines 68 and 162, to the ignition via line(s) 66 (as will be described further herein), to vehicle brake pedal sensor 82 via line 63 and gear position sensor 84 via line 65. It shall be appreciated the one or more inputs or signals received by the security module 90 may alternatively be received by the relay box 62 and passed along via line 67.

In an alternate embodiment, security module 90 may be integrated into relay box 62 or some other component of AC generator system 12. In yet another embodiment, the functions of security module 90 may be integrated into the ignition 32, the engine control module 22 or other components of the existing vehicle 10 from the factory.

Figure 2:
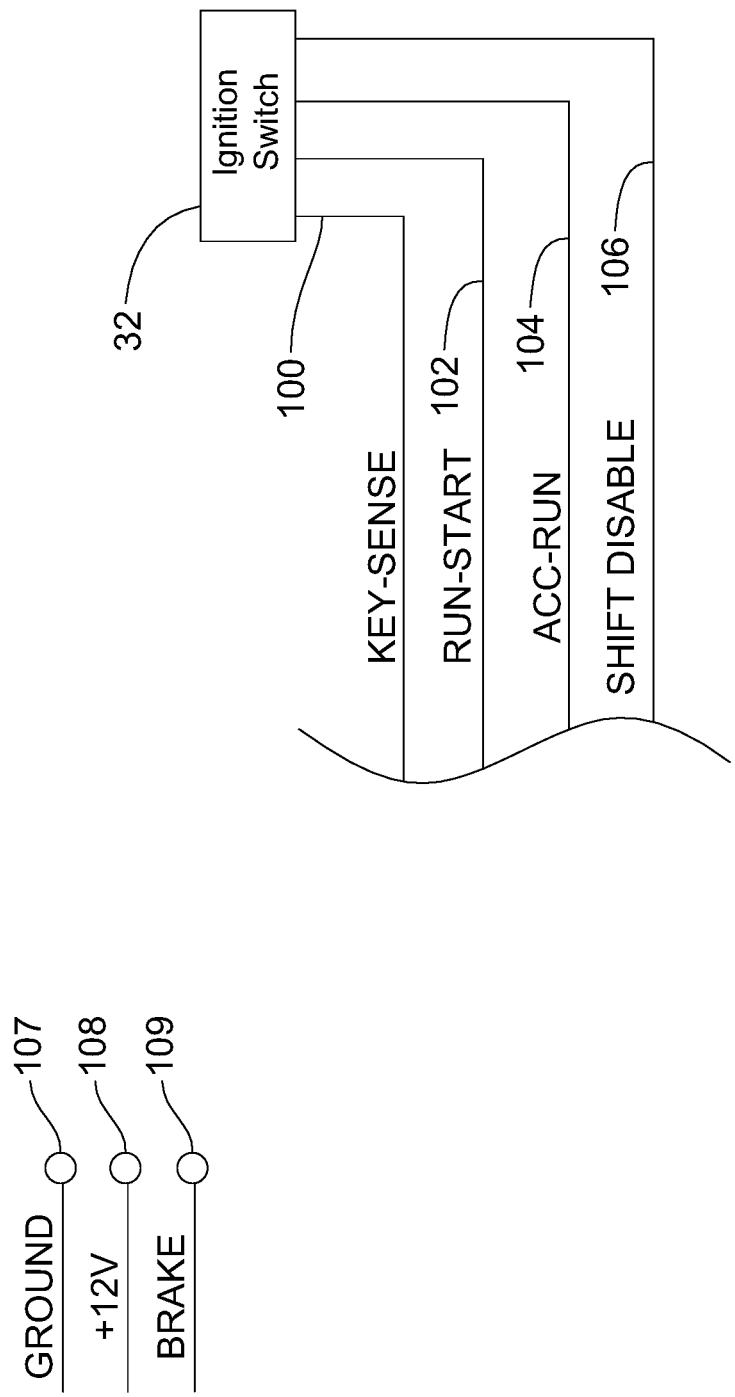
FIG. 2 is a wiring diagram showing a selected portion of the existing vehicle wiring connections which exist within vehicle prior to installation of the vehicle mounted PTO driven generator system.
Figure 3:
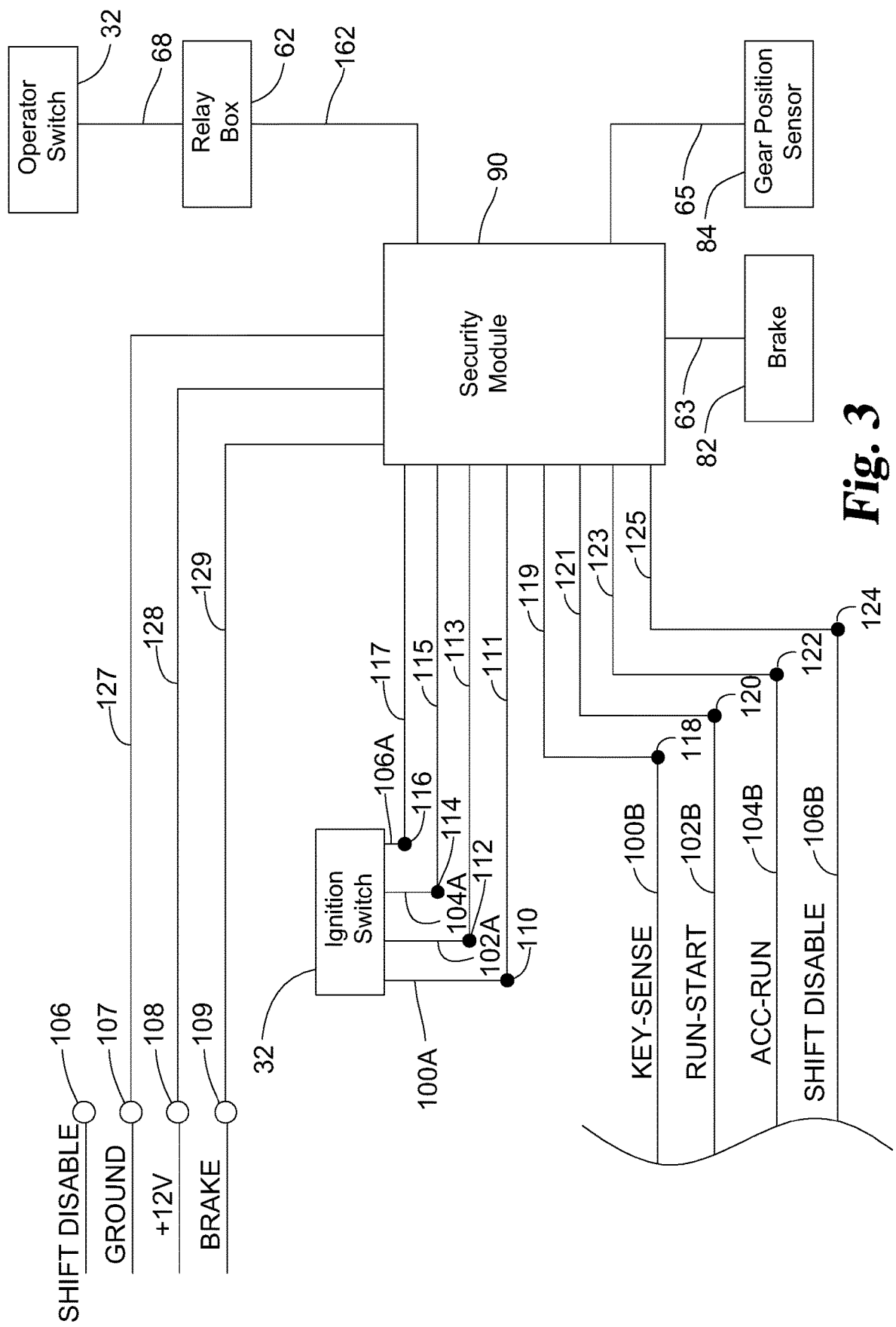
FIG. 3 is a wiring diagram showing modifications and specific connections utilized by the vehicle mounted PTO driven generator system of the embodiment of the present invention shown in FIG. 1.

What has been described above is how the generator system of the present invention integrates with the operational control and safety system of the vehicle 10. Reference is now directed to the remaining figures which show further specifics of the implementation of the system described in FIG. 1. FIGS. 2 and 3 show only those portions of the vehicle 10 necessary to properly explain the present invention. All the other details have been omitted to allow a simplification and focus on a proper understanding of the invention.

Shown in FIG. 2 is a detailed wiring diagram showing a selected portion of the existing vehicle wiring connections which exist within vehicle 10. The wiring connections shown are each utilized by AC generator system 12, and specifically security module 90 thereof. It shall be appreciated that one or more of these wiring connections may exist within a larger vehicle wiring harness, such as those often located behind the dash, within the steering column, under the center console or within the kick plate of one of the doors. Specifically, FIG. 2 shows the ignition switch 32 of vehicle 10 in its factory configuration. For the late model Ford F550, the relevant connections shown in FIG. 2 include the KEY-SENSE wire 100 (which is jacketed in blue/grey), the RUN-START wire 102 (which is jacketed in white/orange), the ACC-RUN wire 104 (which is jacketed in violet/green) and the SHIFT DISABLE wire 106 (which is jacketed in blue/orange). In one form, the SHIFT DISABLE wire 106 may come from the body control module (as shown alternatively, but not used, in FIG. 3) or the brake pedal assembly (not shown), depending upon the vehicle's configuration and/or wiring. In addition, existing vehicle connections such as ground 107, +12V 108 and brake indicator 109 exist, or can be created, within vehicle 10. For example, a new or existing chassis ground would suffice as ground 107, a connection to the battery or other such live accessory wire would suffice as +12V 108, and a connection to a brake light wire could serve as brake indicator 109. However, it is preferred that the brake indicator 109 be taken from a true brake signal, such as the central roofline light, so as to prevent false high signals from hazard lights, safety flashers or the like.

In their ordinary configurations, 12V is output by the ignition switch 32 on the KEY-SENSE wire 100 when the key is inserted into the key cylinder of the ignition 32 of vehicle 10. In other forms, this signal may also include an authentication of a RFID or other advanced security means embedded within the key. This signal is subsequently received and utilized by ECM 22 in operating the engine 14, among other things. For the RUN-START wire 102, 12V is output by the ignition switch 32 on this wire when the ignition cylinder is rotated to "START". This triggers the ECM 22 and the starter motor of the vehicle 10 to start the engine 14. 12V is output on the ACC-RUN wire 104 when the key is first turned to activate the vehicle accessories. This signals the vehicle to provide power from the battery to the vehicles accessories, such as the radio, lights and other features. Lastly, the SHIFT DISABLE wire provides 12V when the brake is depressed, thereby enabling the vehicle to be shifted from park (or otherwise).

FIG. 3 is a detailed wiring diagram showing the modifications and specific connections utilized by security module 90 of AC generator system 12. First, during installation, wires 100, 102, 104 and 106 of FIG. 2 are each cut to form two wire segments, which are identified in FIG. 3 as wire segments 100A and 100B, 102A and 102B, 104A and 104B, and 106A and 106B. Each output from the ignition switch, including wires 100A, 102A, 104A and 106A are each spliced via wire splices 110, 112, 114 and 116 to join new wire connections 111, 113 115, and 117 respectively, which are each connected as inputs to the security module 90. This enables the security module 90 to detect the current state of the ignition switch 32 and other items (such as whether the brake is depressed) based upon the signals detected from wires 111, 113, 115 and 117 which now intercept and carry signals originating from the ignition switch's KEY-SENSE wire 100, RUN-START wire 102, ACC-RUN wire 104 and SHIFT DISABLE 106 respectively. As a result, these signals no longer continue on uninterrupted to their original destination shown in FIG. 2., but rather are selectively passed on or interrupted and modified by security module 90 to have the desire effect upon the operation of vehicle 10 and AC generator system 12.

To achieve the desired effect, the opposite and remaining portions of wires 100, 102, 104 and 106 of FIG. 2 which were cut as described above, including 100B, 102B 104B and 106B, are each spliced via wire splices 118, 120, 122 and 124 to join new wire connections 119, 121, 123 and 125 respectively, which are each connected to outputs on the security module 90. In addition, the security module 90 is connected to and accepts as inputs ground 107, +12V 108 and brake indicator 109 via wire connections 127, 128 and 129 respectively. Additionally, security module 90 may receive one or more inputs rom relay box 62 via connection line 162. Depending upon the nature of the installation, one or more diodes may be utilized within the wiring connections described herein to protect the vehicle 10, the security module 90 or the remaining components of the AC generator system 12.

In the illustrated embodiment, security module 90 is a dedicated circuit consisting of circuit boards and appropriate wiring connections. The security module 90 is preferably installed under the dash or nearest the needed wiring connections so as to limit the amount of wire required and ensure that all new wire and components may remain hidden so as provide a clean installation. In other forms, security module 90 may be a computer system implementing the same logic as is described herein. Alternatively or additionally, security module 90 may be integrated into relay box 62. Either way, the two may be either individually or collectively utilized and/or referred to as a trigger sensor 91.

In operation, using power supplied by wire 108, the security module 90 first determines whether or not its operation is desired/enabled. In the illustrated embodiment, when operator switch 32 is disabled, the security module 90 is also disabled, meaning that the security module 90 configures itself to serve as a simple pass-through which logically replicates the function of the vehicle 10 illustrated in FIG. 2. However, when operator switch 32 is enabled, security module 90 is also enabled and operates to as to protect vehicle 10 from both a safety and security perspective. Specifically, security module 90 enables the key to be removed from the vehicles ignition, while enabling vehicle 10 to continue to operate the engine 14 normally so as to power the AC generator 44. Meanwhile, security module 90 monitors for any change of state of the vehicle 10 or the AC generator system 12 which would warrant the immediate disablement of the engine 14 and the AC generator 44. Upon detecting such an event, the security module 90 signals the ECM 22 that the engine 14 should be stopped, by simply disabling the relevant ignition switch 32 signals.

Figure 4:
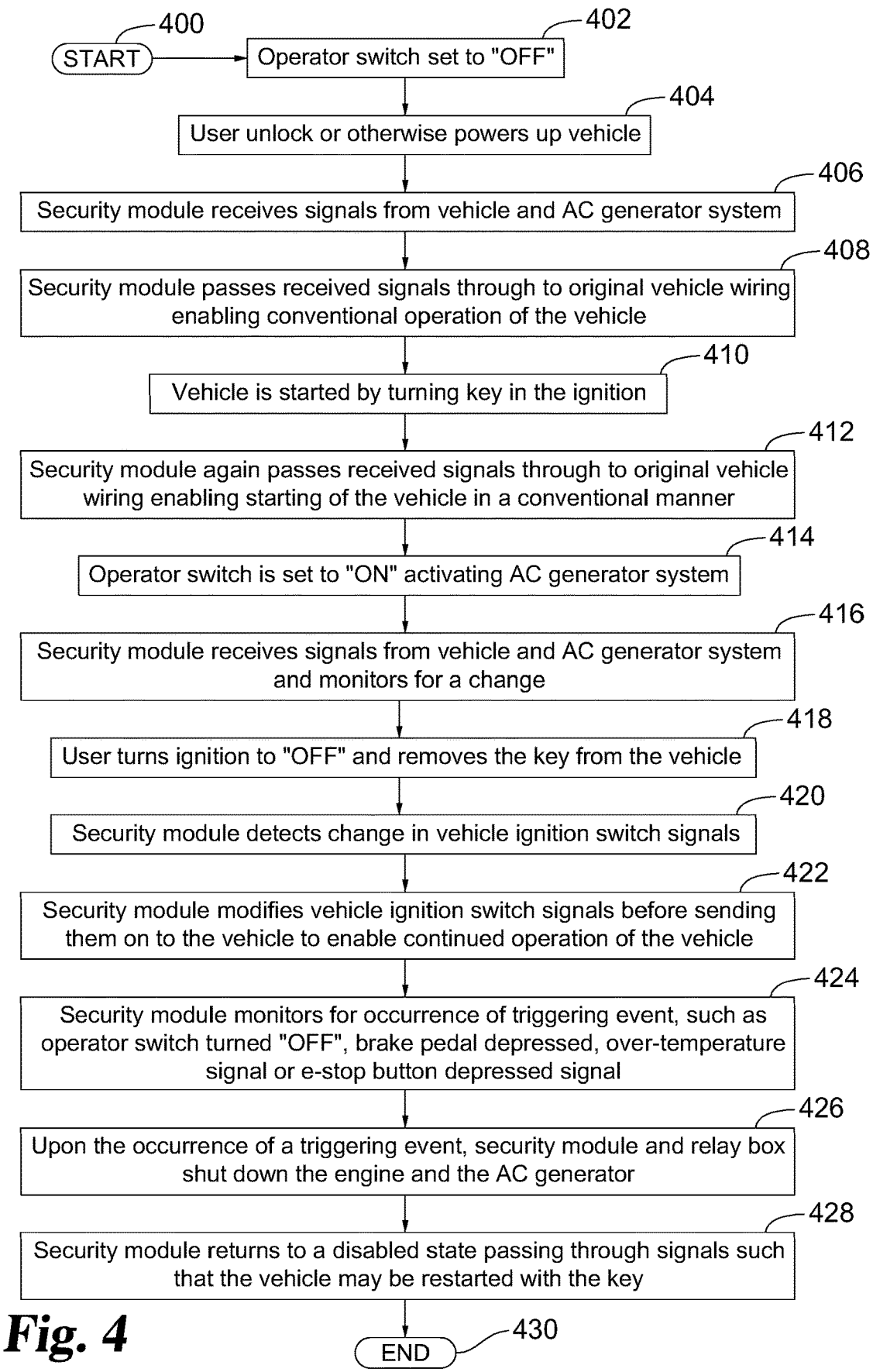
FIG. 4 is a flowchart illustrating the steps involved in the normal operation of a vehicle and AC generator system and, in particular, a security module during typical use.

Shown in FIG. 4 is a flowchart illustrating the steps involved in the normal operation of vehicle 10, AC generator system 12 and, in particular, security module 90 during typical use. The process begins with the operator switch 32 being in the "OFF" positon and therefore the security module 90 is disabled (stage 402). Subsequently, the user unlocks the vehicle, by placing the key into the ignition or otherwise, thereby providing power to the vehicle and thus security module 90 (stage 404). During this phase of operation of vehicle 10, security module 90 receives inputs from the ignition switch 32 and elsewhere indicating the signal present on the vehicle's KEY-SENSE wire 100, RUN-START wire 102, ACC-RUN wire 104 and SHIFT DISABLE 106 (stage 406). If the operator switch 36 remains "OFF", security module 90 remains disabled and as a result security module 90 merely passes along the signals it receives to their corresponding output, functionally enabling the vehicle 10 to operate precisely as originally shown in FIG. 2 (stage 408). Accordingly, the operator may start the vehicle normally by turning the key in the ignition switch 32 (stage 410). By doing so, the appropriate signals are generated by the ignition switch 32, passed through the security module 90, and on to the ECM 22 and elsewhere so as to start the engine 14 (stage 412). In order to enable operation of the AC generator 44, the operator switches "ON" the operator switch 36, which causes the AC generator system 12 to begin operations as described above (stage 414).

At this point, traditionally the operator of vehicle 10 would be left with no choice but to leave the key in the ignition and exit the vehicle in order to make use of the power provided by AC generator 44 and perform the desired job. However, this leaves the cab of the vehicle unsecured and the keys available to any would be thief or other passerby. Obviously, this situation presents numerous vulnerabilities and safety issues which need to be addressed.

In the present invention, by enabling the operator switch 36 security module 90 is also enabled. As such, security module 90 monitors the input signals which originate from wires 100A, 102A, 104A and 106A which provide information regarding the status of vehicle 10 (stage 416), and, upon detecting a change resulting, intervenes to cause the appropriate action, as outlined below. For example, when AC generator 44 is operating, the security module 90 will allow the ignition to be turned off and the key removed, but the operation of the engine 14 will continue. When the key is removed from the ignition (stage 418), the input signals which originate from wires 100A, 102A, 104A and 106A change. For example, the KEY-SENSE and ACC-RUN signals may drop off or pulse to signal a change in state. The security module 90, when enabled, detects this and does not merely pass through the signal change (stage 420). Rather, the security module 90 continues providing the prior signal as if nothing had changed. This enables the vehicle to continue to operate engine 14 and other accessories as if the key were never touched, while permitting the operator to remove the key and secure the cab of vehicle 10 (stage 422). At all times during operation of the AC generator 44, e-stop 74 and over-temperature sensor 78 remain active to monitor and ensure the safe operation of system 12, along with the occurrence of any other triggering events (stage 424). As discussed above, the engine 14 is allowed to continue to operate until any of the following triggering events occurs: (1) the operator switch 36 is turned off, (2) the emergency switch 74 in output box 72 is activated, (3) the over-temperature sensor 78 indicates too high a temperature through output box 72 (4) the brake of the vehicle is depressed (5). Other triggering events may be provided for within security module 90, such as the unlocking of doors, turning of the steering wheel or other undesirable acts which a third-party or unauthorized person may attempt to take on the unattended vehicle. In the event a triggering event is detected, relay box 60 cuts the signal to the solenoid 56 which disengages the PTO unit 50 from the transmission 16 and therefore stops the operation of AC generator 44. Additionally, relay box 62 sends a signal to security module 90 which causes security module 90 to shut down the engine 14 (stage 426). In one form, this shut down signal might implemented by sending a pulse or going low on the ACC-RUN output wire 117 and/or KEY-SENSE output wire 121 from security module 90. Other faults which may trigger a similar shut down include the pressing of the vehicle's brake pedal, as sensed by wire 109/129, the attempt to put the vehicle in drive, or the turning "OFF" of the operator switch 36. I the case of some triggering events, the security module 90 and/or relay box 62 may be programmed or configured such that the AC generator 44 only may be disabled if desired. This option is particularly useful for the over temperature or e-stop events, which may relate only to the AC generator system 12 and its continued operation. In another form, a single press of the estop 74 may disable the AC generator whereas a long press may disable both the AC generator and the engine 14. Alternatively, an initial over-temperature signal from the over-temp sensor 78 may disable the AC generator, however, a continued signal from the over-temp sensor may subsequently disable the engine 14 as a backup measure.

Once the vehicle has been disabled by having the engine 14 turned off, the engine 14 may be restarted by using the key (stage 428). In one form, the vehicle cannot be restarted except for by a person having the key. The process ends at end point 430.

In an alternate form of FIG. 4, the user may turn the operator switch "ON" before starting the vehicle and the security module 90 enables the signals to pass through to enable conventional starting of the vehicle nonetheless, and only thereafter intercepts and modifies the signals to enable the continued operation of the vehicle absent the key as well as other necessary shut down of the engine 14 if one of the triggering events occurs. In such a situation, the operation of AC generator 44 and the PTO program begins shortly after the vehicle is started as controlled by the ECM 22 and the relay box 62.

In one form, the SS0002 Vehicle Anti-Theft System, available from Pro-gard Products LLC located at 9650 East 148th Street, Noblesville, Ind. 46060, may be used as at least a portion of security module 90.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected. Hence, the proper scope of the present invention should be determined only by the broadest interpretation of the appended claims so as to encompass all such modifications as well as all relationships equivalent to those illustrated in the drawings and described in the specification.

What is claimed is:

1. A vehicle mounted AC electrical generator system capable of safe and secure operation, the vehicle mounted AC electrical generator system comprising:
    a vehicle frame supporting a prime mover and an AC generator, wherein operation of the prime mover is selectively enabled by at least an ignition switch;
    a power take-off driven by the prime mover and operably connected to the AC generator for driving the AC electrical generator to produce electricity;
    an electrical power output box electrically connected to the AC generator;
    at least one of an over-temperature switch monitoring the temperature of the AC electrical generator and a manual emergency stop switch separate from the ignition switch for the AC electrical generator system; and
    a security module for modifying at least one electrical signal from the ignition switch to permit the continued activation of the prime mover when a corresponding vehicle key is no longer physically present in the vehicle and for detecting the occurrence of a triggering event within the vehicle and thereafter automatically changing the at least one electrical signal to shut down the prime mover and the AC generator, wherein the security module is connected to at least one ignition wire originating from the ignition switch of the vehicle; wherein the triggering event is one of a changing position of a gear shifter in the vehicle, a depression of a brake pedal in the vehicle, an activation of the over-temperature switch, or an activation of the emergency stop switch.

2. The vehicle mounted AC electrical generator system capable of safe and secure operation as claimed in claim 1, wherein the security module shuts down the AC generator by disconnecting the AC generator from the power take-off of the vehicle.

3. The vehicle mounted AC electrical generator system capable of safe and secure operation as claimed in claim 1, wherein the at least one electrical signal from the ignition switch includes a run-start signal of the vehicle.

4. The vehicle mounted AC electrical generator system capable of safe and secure operation as claimed in claim 1, wherein the at least one electrical signal from the ignition switch includes a key-sense signal of the vehicle.

5. The vehicle mounted AC electrical generator system capable of safe and secure operation as claimed in claim 1, wherein the at least one electrical signal from the ignition switch includes an accessory-run signal of the vehicle.

6. The vehicle mounted AC electrical generator system capable of safe and secure operation as claimed in claim 1, wherein the corresponding vehicle key is no longer physically present in the vehicle when the corresponding vehicle key is removed from an ignition switch of the vehicle.

7. The vehicle mounted AC electrical generator system capable of safe and secure operation as claimed in claim 1, wherein the at least one ignition wire of the vehicle is selected from the group consisting of a key-sense wire, an acc-run wire and a run-start wire.

8. The vehicle mounted AC electrical generator system capable of safe and secure operation as claimed in claim 1, wherein the prime mover is an internal combustion engine.

9. The vehicle mounted AC electrical generator system capable of safe and secure operation as claimed in claim 8, wherein the internal combustion engine is a diesel engine.

10. The vehicle mounted AC electrical generator system capable of safe and secure operation as claimed in claim 1, wherein the vehicle has a bed and the electrical power output box is mounted to the bed.

11. The vehicle mounted AC electrical generator system capable of safe and secure operation as claimed in claim 1, wherein the vehicle has a rear cargo area mounted to the rear of the frame and the electrical power output box is mounted to the rear cargo area.

12. The vehicle mounted AC electrical generator system capable of safe and secure operation as claimed in claim 1, wherein the security module is powered by 12 volts and connected to an on-board battery for the vehicle.

13. The vehicle mounted AC electrical generator system capable of safe and secure operation as claimed in claim 1, wherein the security module is operable to enter a disabled state wherein the electrical signals received, at its inputs, from the ignition switch of the vehicle are passed directly through to the corresponding outputs of the security module.

14. The vehicle mounted AC electrical generator system capable of safe and secure operation as claimed in claim 13, wherein the security module is placed into the disabled state when the AC generator is not operational.

15. The vehicle mounted AC electrical generator system capable of safe and secure operation as claimed in claim 1, wherein the AC generator generates between approximately 120V single phase and 500V three phase when operating at 1800 RPM.

16. The vehicle mounted AC electrical generator system capable of safe and secure operation as claimed in claim 1, wherein the AC generator generates approximately 120V when operating at 1800 RPM.

17. The vehicle mounted AC electrical generator system capable of safe and secure operation as claimed in claim 1, wherein the operator switch is a factory upfitter switch in the vehicle.

18. The vehicle mounted AC electrical generator system capable of safe and secure operation as claimed in claim 1, wherein at least one of the over-temperature switch monitoring the temperature of the AC electrical generator and the manual emergency stop switch separate from the ignition switch for the AC electrical generator system is electrically connected to the security module.

19. A vehicle mounted AC electrical generator system capable of safe and secure operation, the vehicle mounted AC electrical generator system comprising:
- a vehicle frame supporting an internal combustion engine and an AC generator, wherein operation of the internal combustion engine is selectively enabled by at least an ignition switch;
- a power take-off driven by the internal combustion engine and operably connected to the AC generator for rotating at least a portion of the AC electrical generator to produce electricity;
- an electrical power output box electrically connected to the AC generator;
- an over-temperature switch monitoring the temperature of the AC electrical generator and a manual emergency stop switch separate from the ignition switch for the AC electrical generator system;
- a security module for modifying at least one electrical signal output from the ignition switch to permit the internal combustion engine and AC generator to continue to run when a corresponding vehicle key is no longer physically present in an ignition lock cylinder of the ignition switch and for subsequently detecting the occurrence of a triggering event within the vehicle and thereafter automatically changing the at least one electrical signal to shut down the internal combustion engine and the AC generator, wherein the security module is connected to at least one ignition wire originating from the ignition switch of the vehicle;

wherein the triggering event is one of a changing position of a gear shifter in the vehicle, a depression of a brake pedal in the vehicle, an activation of the over-temperature switch, or an activation of the emergency stop switch.

20. A vehicle mounted AC electrical generator system capable of safe and secure operation, the vehicle mounted AC electrical generator system comprising:
- a vehicle frame supporting a prime mover and an AC generator, wherein operation of the prime mover is selectively enabled by at least an ignition switch;
- a power take-off driven by the prime mover and operably connected to the AC generator for driving the AC electrical generator to produce electricity;
- an electrical power output box electrically connected to the AC generator;
- at least one of an over-temperature switch monitoring the temperature of the AC electrical generator and a manual emergency stop switch separate from the ignition switch for the AC electrical generator system; and
- a security module for modifying at least one electrical signal from the ignition switch to permit the continued activation of the prime mover when a corresponding vehicle key is no longer physically present in the vehicle and for detecting the occurrence of a triggering event within the vehicle and thereafter automatically changing the at least one electrical signal to shut down the prime mover and the AC generator, wherein the security module is connected to at least one ignition wire originating from the ignition switch of the vehicle.

* * * * *